(12) United States Patent
Mai et al.

(10) Patent No.: US 10,509,391 B2
(45) Date of Patent: Dec. 17, 2019

(54) MACHINE TOOL COLLISION AVOIDANCE METHOD AND SYSTEM USING THE SAME

(71) Applicant: INDUSTRIAL TECHNOLOGY RESEARCH INSTITUTE, Hsinchu (TW)

(72) Inventors: Chao-Chuang Mai, Taichung (TW); Chin-Hui Chen, Taichung (TW); Shu-Yu Lin, Taichung (TW)

(73) Assignee: INDUSTRIAL TECHNOLOGY RESEARCH INSTITUTE, Chutung, Hsinchu (TW)

( * ) Notice: Subject to any disclaimer, the term of this patent is extended or adjusted under 35 U.S.C. 154(b) by 75 days.

(21) Appl. No.: 15/970,666

(22) Filed: May 3, 2018

(65) Prior Publication Data
US 2019/0219984 A1 Jul. 18, 2019

(30) Foreign Application Priority Data
Jan. 12, 2018 (TW) .............................. 107101285 A

(51) Int. Cl.
G06F 19/00 (2018.01)
G05B 19/4061 (2006.01)
G05B 19/4069 (2006.01)

(52) U.S. Cl.
CPC ..... *G05B 19/4061* (2013.01); *G05B 19/4069* (2013.01); *G05B 2219/49141* (2013.01)

(58) Field of Classification Search
CPC ...................................................... F16P 3/12
(Continued)

(56) References Cited

U.S. PATENT DOCUMENTS 4,489,377 A * 12/1984 Mawyer ............. G05B 19/4061
318/565
4,651,601 A *  3/1987 Sasaki .................... B21D 28/12
700/178
(Continued)

FOREIGN PATENT DOCUMENTS

CN          1796046 A      7/2006
CN        104589346 A      5/2015
(Continued)

OTHER PUBLICATIONS

Lin, Jiun-Ting; "NC Simulation for Adaptive Look-Ahead Interpolator With On-Line Collision Detection"; National Chung Cheng University; Mechanical Engineerying; 2014; 1 pg.
(Continued)

*Primary Examiner* — Suresh Suryawanshi
(74) *Attorney, Agent, or Firm* — Muncy, Geissler, Olds & Lowe, P.C.

(57) ABSTRACT

A machine tool collision avoidance method includes: loading multiple processing codes; simulating multiple path traces corresponding to the processing codes; estimating multiple execution periods for running the path traces; selecting the shortest execution period from the execution periods; determines whether the distance between the trace point points on any two of the path traces is less than a safety distance within the shortest execution period; if the distance between a first trace point on a first path trace and a second trace point on a second path trace is less than the safety distance, estimating a first time point at which a first turret runs to the first trace point and a second time point at which the second turret runs to the second trace point; generating a collision warning if the difference between the first time point and the second time point is lower than a tolerance value.

20 Claims, 10 Drawing Sheets

(58) Field of Classification Search
USPC .......................................................... 700/177
See application file for complete search history.

(56) References Cited

U.S. PATENT DOCUMENTS

| | | | |
|---|---|---|---|
| 4,843,691 A | 7/1989 | Hafla et al. | |
| 5,739,660 A * | 4/1998 | Gnann | G05B 19/4061 318/565 |
| 6,678,582 B2 | 1/2004 | Waled | |
| 8,577,591 B2 | 11/2013 | Schinerl | |
| 8,630,732 B2 * | 1/2014 | Tolkmitt | G05B 15/02 700/178 |
| 9,069,347 B2 * | 6/2015 | Kettemer | G05B 19/4061 |
| 9,395,719 B2 * | 7/2016 | Sagasaki | G05B 19/4067 |
| 2011/0035044 A1 * | 2/2011 | Takahashi | G05B 19/4069 700/178 |
| 2013/0035916 A1 | 2/2013 | Girard | |
| 2015/0251315 A1 * | 9/2015 | Brandenberger | B25J 9/1676 700/255 |
| 2015/0284010 A1 | 10/2015 | Beardsley et al. | |
| 2017/0067737 A1 | 3/2017 | Yu et al. | |
| 2017/0090454 A1 | 3/2017 | Barakchi Fard et al. | |

FOREIGN PATENT DOCUMENTS

| | | |
|---|---|---|
| CN | 104871100 A | 8/2015 |
| CN | 106127845 A | 11/2016 |
| TW | 201007402 A | 2/2010 |
| TW | I 330303 B | 9/2010 |
| WO | WO2007012351 A1 | 2/2007 |
| WO | WO 2013072725 A1 | 5/2013 |
| WO | WO 2016179186 A1 | 11/2016 |

OTHER PUBLICATIONS

She, Tung-Ying; "Applying 3D Stereo Vision Measurement to Collision Avoidance of Five-Axis CNC Machine"; National Chung Cheng University; Electrical Engineering; Jan. 2014; 109 pgs.

Tsai, Ho-Hsuan; "Studies on Optimal Path Planning and SEL-Collision Avoidance of 7-DOF Manipulators"; National Chiao Tung University; Institute of Electrical and Control Engineering; Dec. 2015; 67 pgs.

Qui, Jian-Ming; "Collision Detection for Five-Axis Machining Using Object Oriented CSG Models"; National Chiao Tung University; Mechanical Engineering; Jan. 2014; 82 pgs.

Yan, Jia-Liang; "Research on Real-Time Collision Detection for Five-Axis Machining"; National Chung Cheng University; Mechanical Engineering; Jan. 2012; 95 pgs.

Ahmad, Rafiq et al; "New Computer Vision Based Snakes and Ladders Algorithm for the Safe Trajectory of Two Axis CNC Machines"; Computer Aided Design; Dec. 26, 2011; 12 pgs.

* cited by examiner

MACHINE TOOL COLLISION AVOIDANCE METHOD AND SYSTEM USING THE SAME

This application claims the benefit of Taiwan application Serial No. 107101285, filed Jan. 12, 2018, the disclosure of which is incorporated by reference herein in its entirety.

TECHNICAL FIELD

The disclosure relates in general to a machine tool collision avoidance method and a system using the same.

BACKGROUND

Along with the advance in technology, the application of machine tools is getting more and more diversified, and multi-system machine tools are becoming more and more popular. Multi-system machine tools refer to the machine tools adopting a number of turrets at the same time.

However, most conventional mechanisms of collision avoidance are designed to serve single system (such as single turret) machine tools not designed for multi-system machine tools. Besides, conventional mechanisms of collision avoidance are normally performed when the machine tools actually perform interpolation processing or idle run, and therefore consume more time cost.

SUMMARY

The disclosure is directed to a machine tool collision avoidance method and a system using the same. Whether the distance between the path traces of turrets is less than a safety distance is detected by way of fast simulation. If yes, the time points on the trace points at which the turret may collide are calculated to evaluate whether the turrets may collide or not. According to the method and system of the present disclosure, collision detection can be performed on multiple path traces of the turrets during fast simulation, and the execution of one single session is quicker than the execution of actual interpolation or idle run, such that the user's preparation time before the processing can be saved.

According to one embodiment, a machine tool collision avoidance method executed by a processing circuit is disclosed. The method includes: loading a number of processing codes corresponding to a number of turrets operated in a first session; simulating a number of path traces corresponding to the processing codes; estimating a number of execution periods within which the turrets run along the path traces; selecting the shortest execution period from the execution periods; determines whether the distance between the trace point points on any two of the path traces is less than a safety distance within the shortest execution period; if the distance between a first trace point on a first path trace and a second trace point on a second path trace is less than the safety distance, estimating a first time point at which a first turret of the turrets runs to the first trace point and a second time point at which the second turret of the turrets runs to the second trace point; determines whether the difference between the first time point and the second time point is lower a tolerance value; generating a collision warning if the difference between the first time point and the second time point is lower than a tolerance value.

According to another embodiment, a collision avoidance system including a memory and a processing circuit is disclosed. The processing circuit is coupled to the memory for executing following steps: loading a number of processing codes corresponding to a number of turrets operated in a first session; simulating a number of path traces corresponding to the processing codes; estimating a number of execution periods within which the turrets run along the path traces; selecting the shortest execution period from the execution periods; determines whether the distance between the trace point points on any two of the path traces is less than a safety distance within the shortest execution period; if the distance between a first trace point on a first path trace and a second trace point on a second path trace is less than the safety distance, estimating a first time point at which a first turret of the turrets runs to the first trace point and a second time point at which the second turret of the turrets runs to the second trace point; determining whether the difference between the first time point and the second time point is lower than a tolerance value; generating a collision warning if the difference between the first time point and the second time point is lower than a tolerance value.

The above and other aspects of the invention will become better understood with regard to the following detailed description of the preferred but non-limiting embodiment (s). The following description is made with reference to the accompanying drawings.

Figure 1:
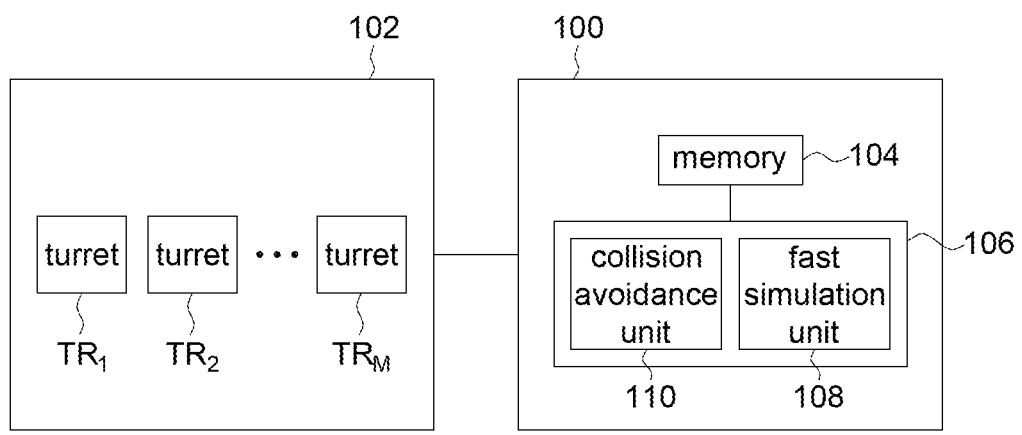
FIG. 1 shows a block diagram of a collision avoidance system according to an embodiment of the present disclosure.

In the following detailed description for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

FIG. 1 shows a block diagram of a collision avoidance system 100 according to an embodiment of the present disclosure. The collision avoidance system 100 includes a memory 104 and a processing circuit 106. The machine tool 102 is, for example, a milling machine tool. The machine tool 102 can include M turrets TR1~TRM, wherein M is a positive integer greater than 1. Each of the turrets TR1~TRM may respectively include one or more than one tool. It should be noted that although the machine tool collision avoidance method and the system using the same disclosed in the present disclosure are exemplified by turrets, the present disclosure is not limited thereto. The machine tool collision avoidance method and the system using the same disclosed in the present disclosure can be used to the collision avoidance control of the machine tool of multi-systems.

In an embodiment, the collision avoidance system 100 can be implemented in the controller of the machine tool 102 (closed system). In another embodiment, the collision avoidance system 100 can be implemented as an external computer or console connected to the machine tool 102 (open system). The collision avoidance system 100 can control the operation of the machine tool 102 and can realize the collision avoidance mechanism of turrets according to the embodiments of the present disclosure.

The memory 104 stores the programs, instructions, data or files for the processing circuit 106 to obtain or execute. The processing circuit 106 is coupled to the memory 104 and configured to execute the machine tool collision avoidance method of the embodiments of the present disclosure. The processing circuit 106 can be implemented by a microcontroller, a microprocessor, a digital signal processor, an application specific integrated circuit (ASIC), a digital logic circuit, a field programmable gate array (FPGA), or a hardware element with arithmetic processing function.

The processing circuit 106 may include a fast simulation unit 108 and a collision avoidance unit 110, wherein the two units can be implemented by software (such as programs, instructions, files, data), hardware (such as logic circuits) or a combination thereof.

The fast simulation unit 108 quickly simulates the path traces of the turrets TR1~TRM in each session. The collision avoidance unit 110 determines whether collision may occur according to the spatial information of the path traces (such as the trace points on the path traces) and the time information of the path traces (such as the time point at which the turret runs to a specific trace point). The collision avoidance unit 110 further generates a collision warning when it is determined that collision may occur.

In the present disclosure, "fast simulation" refers to a path simulation which directly links the nodes of a session (such as the starting point and end point of a session) and does not need to generate the points between the starting node and ending node of the session by using interpolation. For example, assume the edge length of a square path is 100 millimeters (mm) and the maximum cutting speed of the machine tool is 1000 millimeters per minute. Under such circumstances, the execution time for the conventional simulation is about 24 seconds, but the execution time for the fast simulation is only about 12 milliseconds being 2,000 times faster than the conventional simulation. This is because fast simulation is only interrupted for 4 times, and the points on the edges of the square path do not need to be generated one by one.

Besides, the operations related to the fast simulation unit 108 and the collision avoidance unit 110 of the embodiments of the present disclosure can be implemented in a pre-stage prior to actual operation of the machine tool 102. The pre-stage does not to be involved with actual operation or idle run of the turrets TR1~TRM. In the pre-stage, the path traces of the turrets TR1~TRM are simulated by using software, and whether the turrets TR1~TRM may collide is pre-determined before the turrets TR1~TRM operate according to the processing codes.

Figure 2:
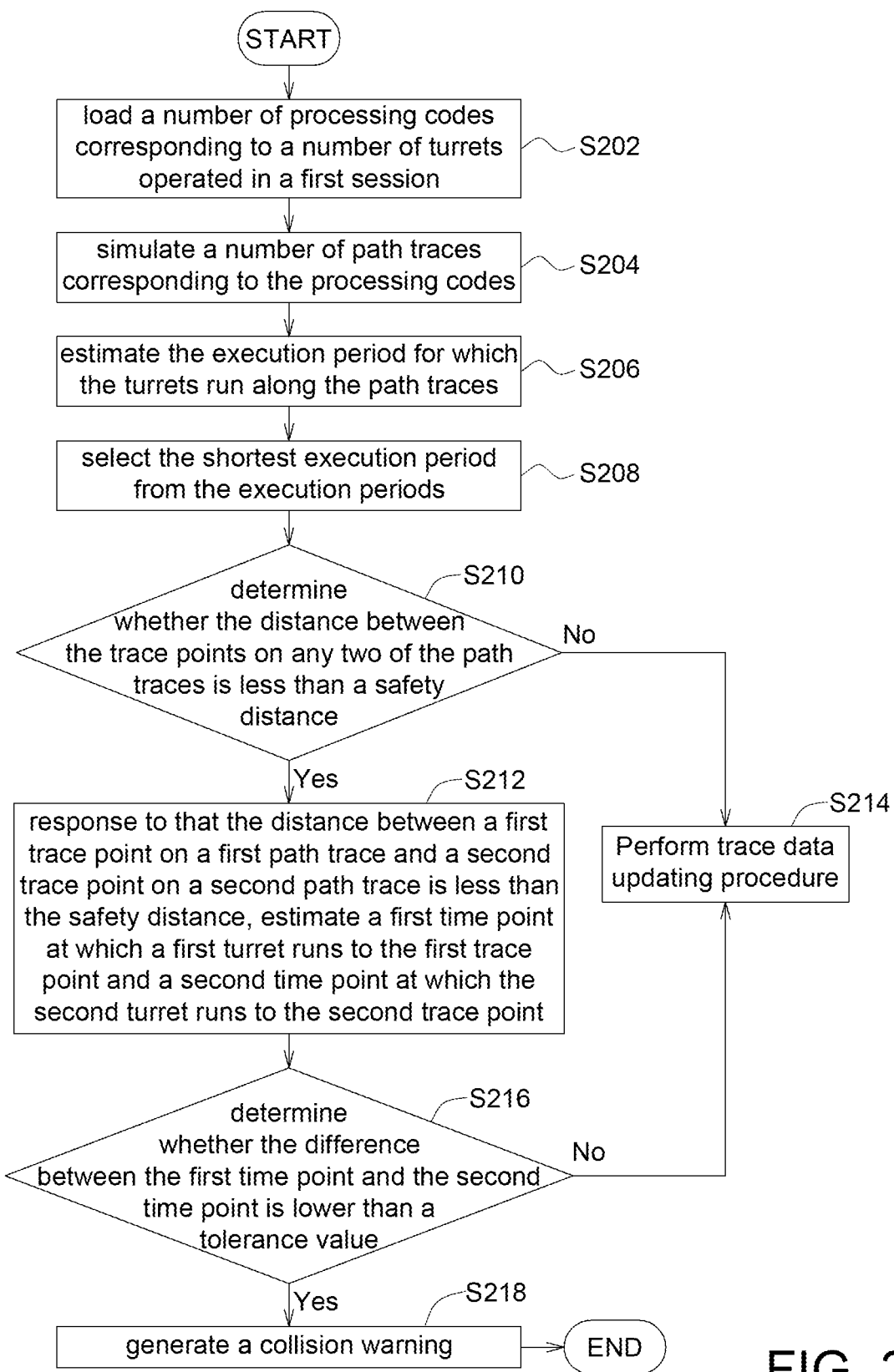
FIG. 2 shows a flowchart of a machine tool collision avoidance method according to an embodiment of the present disclosure.

FIG. 2 shows a flowchart of a machine tool collision avoidance method according to an embodiment of the present disclosure. The machine tool collision avoidance method can be performed by the collision avoidance system 100.

In step S202, the fast simulation unit 108 loads a number of processing codes corresponding to a number of turrets operated in a first session. The processing codes can be, for example, an NC instruction code or other instruction codes used for controlling the machine tool 102 to operate.

In step S204, the fast simulation unit 108 simulates a number of path traces corresponding to the processing codes. For example, the fast simulation unit 108 can generates a number of path traces of the turrets TR1~TRM in the first session by fast simulation. In an embodiment, different path traces respectively denote the traces of the tip points of different turrets TR1~TRM. However, the present disclosure is not limited thereto. In an embodiment, the path trace of a turret can be represented by the trace of a specific mass point or a centroid of the turret.

In step S206, the fast simulation unit 108 estimates the execution period for which the turrets TR1~TRM run along path traces. For example, the fast simulation unit 108 obtains a number of motion parameter groups, with which the turrets TR1~TRM respectively run in the first session, from the controller of the machine tool 102. Then, the fast simulation unit 108 estimates the execution period required for each of the turrets TR1~TRM to run along the corresponding path trace according to the motion parameter groups. Each motion parameter group can include one or more than one speed related parameter, such as the speed parameter representing the running speed of a turret and the acceleration parameter representing the running acceleration of a turret.

In an embodiment, the fast simulation unit 108 can set a number of start point parameters Oldtime# respectively indicating the start points of different execution periods. The fast simulation unit 108 obtains the motion parameter groups with which different turrets run along corresponding path traces by using the machine tool 102 and/or the processing codes. And the fast simulation unit 108 estimates the time required for different turrets to run along the path traces according to the motion parameter groups to set a number of end point parameters Runtime#. The end point parameters Runtime# respectively indicate the end points of different execution periods. For example, assume the turret runs along a path trace within the period of 0~5 seconds. Then, the execution time of the path trace can be described as [Oldtime=0, Runtime=5].

In step S208, the collision avoidance unit 110 selects the shortest execution period from the execution periods. For example, assume the execution period within which the turret TR1 runs along the path trace in the first session is 0~5 seconds, and the execution period within which the turret TR2 runs along the path trace in the first session is 0~10 seconds. Then, the shortest execution period is 0~5 seconds.

In step S210, the collision avoidance unit 110 determines whether the distance between the trace points on any two of the path traces is less than a safety distance. If the result of determination is positive, which implies that collision may occur between the turrets, then the method proceeds to step S212. If the result of determination is negative, which implies that no collision may occur between the turrets in the first session, then the method proceeds to step S214, the fast simulation unit 108 executes the trace data updating procedure to detect the possibility of collision in the second session, which is subsequent to the first session.

In an embodiment, assume the shortest execution period selected in step S208 is [Oldtime#Ta, Runtime#Tb], that is, the start point of the shortest execution period is defined as Oldtime#Ta, and the end point of the shortest execution period is defined as Runtime#Tb. After having executed the trace data updating procedure in step S214, the fast simulation unit 108 updates each execution period. The trace data updating procedure, for example, includes: updating the start point parameter of each execution period as Runtime#Tb; loading another processing code used for describing the operation of a specific turret in the second session, wherein the execution time required for the specific turret to complete the first session corresponds to the shortest execution period (in other words, the time required for the specific turret to run along the path traces in the first session is equivalent to the shortest execution period selected in step S208); estimating the time required for the specific turret to complete the operation in the second session and updating the specific end point parameter according to the estimated time (for example, Runtime#Tb is updated as Runtime#Tb').

Through the above procedure, the start point of each execution period is updated as Runtime#Tb, and the end point of the original shortest execution period is updated as Runtime#Tb'. Since the length of the updated execution period changes, in step S208, the collision avoidance unit 110 selects the shortest execution period from the updated execution periods to perform collision detection in the next session.

In step S212, when the collision avoidance unit 110 detects that the distance between a first trace point on a first path trace to which the first turret runs and a second trace point on a second path trace to which the second turret runs is less than the safety distance, which implies that the first trace point and the second trace point are the trace points at which the first turret and the second turret may collide, the collision avoidance unit 110 estimates a first time point at which a first turret runs to the first trace point and a second time point at which the second turret runs to the second trace point.

In an embodiment, the collision avoidance unit 110 estimates the first time point according to the position of the first trace point, the first motion parameter group, with which the first turret runs along the first path trace (such as one or more than one parameter related to speed), and a first kinematic function describing the first path trace; and estimates the second time point according to the position of the second trace point, the second motion parameter group, with which the second turret runs along the second path trace (such as one or more than one parameter related to speed), and a second kinematic function describing the second path trace.

In an embodiment, the first kinematic function and the second kinematic function may include at least one of a linear kinematic function and a curve kinematic function. For example, both the first kinematic function and the second kinematic function are linear kinematic functions or curve kinematic functions; or, one is a linear kinematic function, and the other is a curve kinematic function. However, the present disclosure is not limited thereto, and the kinematic functions can be defined according to the path traces described by the corresponding processing codes.

In step S216, the collision avoidance unit 110 determines whether the difference between the first time point and the second time point is lower than a tolerance value. If the result of determination is positive, which implies that the first turret and the second turret may collide in the first session, then the method proceeds to step S218, the collision avoidance unit 110 generates a collision warning to warn the operator of relevant collision information, such as possible collision positions or session numbers, so that the operator can modify the processing codes/programming code and terminate the simulation. If the result of determination is negative, which implies that the turrets will not collide in the first session, then the method returns to step S214 to load the trace data of the next session. The tolerance value is dependent on the situations of application. In an embodiment, the tolerance value is set to be 10 milliseconds.

Through the above method, the collision avoidance mechanism of multi-turret machine tool can be implemented. Since the fast simulation unit 108 and the collision avoidance unit 110 perform collision detection by simulating the path traces of the turrets by way of fast simulation and are not related to the actual operation or idle run of the turrets, the execution speed of collision avoidance simulation can be significantly increased.

Figure 3A:
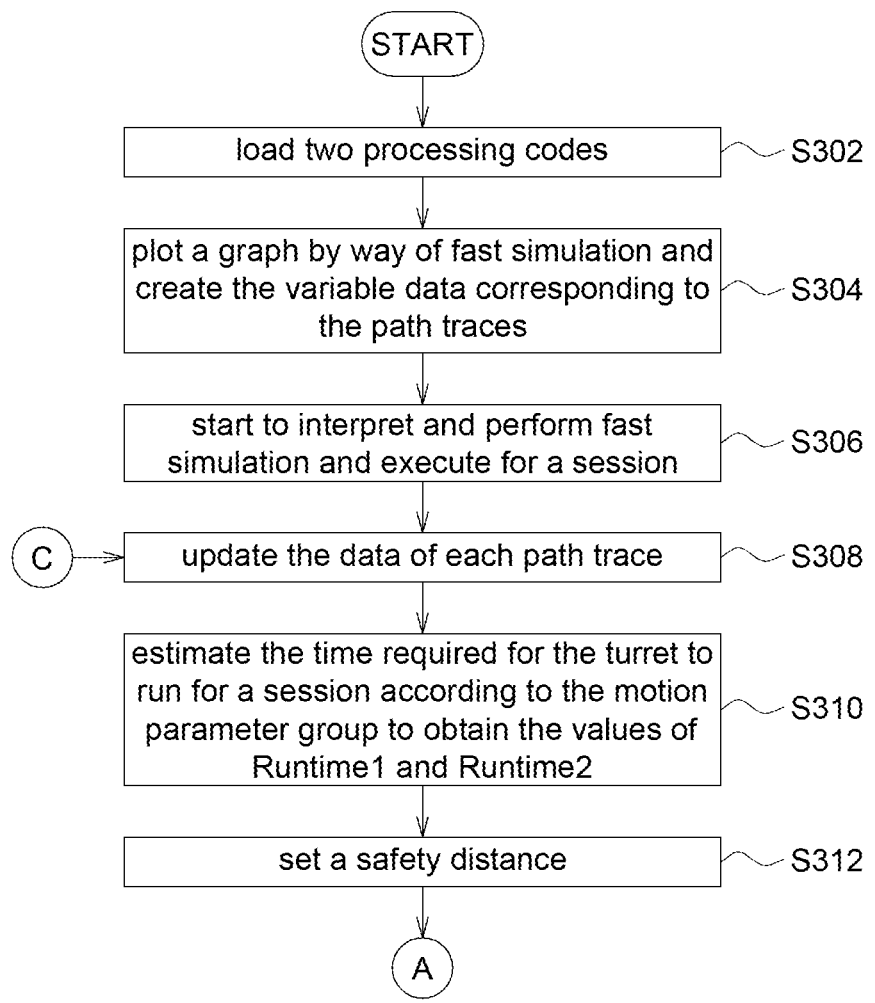
FIGS. 3A~3C show an example of a flowchart of a collision avoidance method adapted for a double-turret machine tool.
Figure 3B:
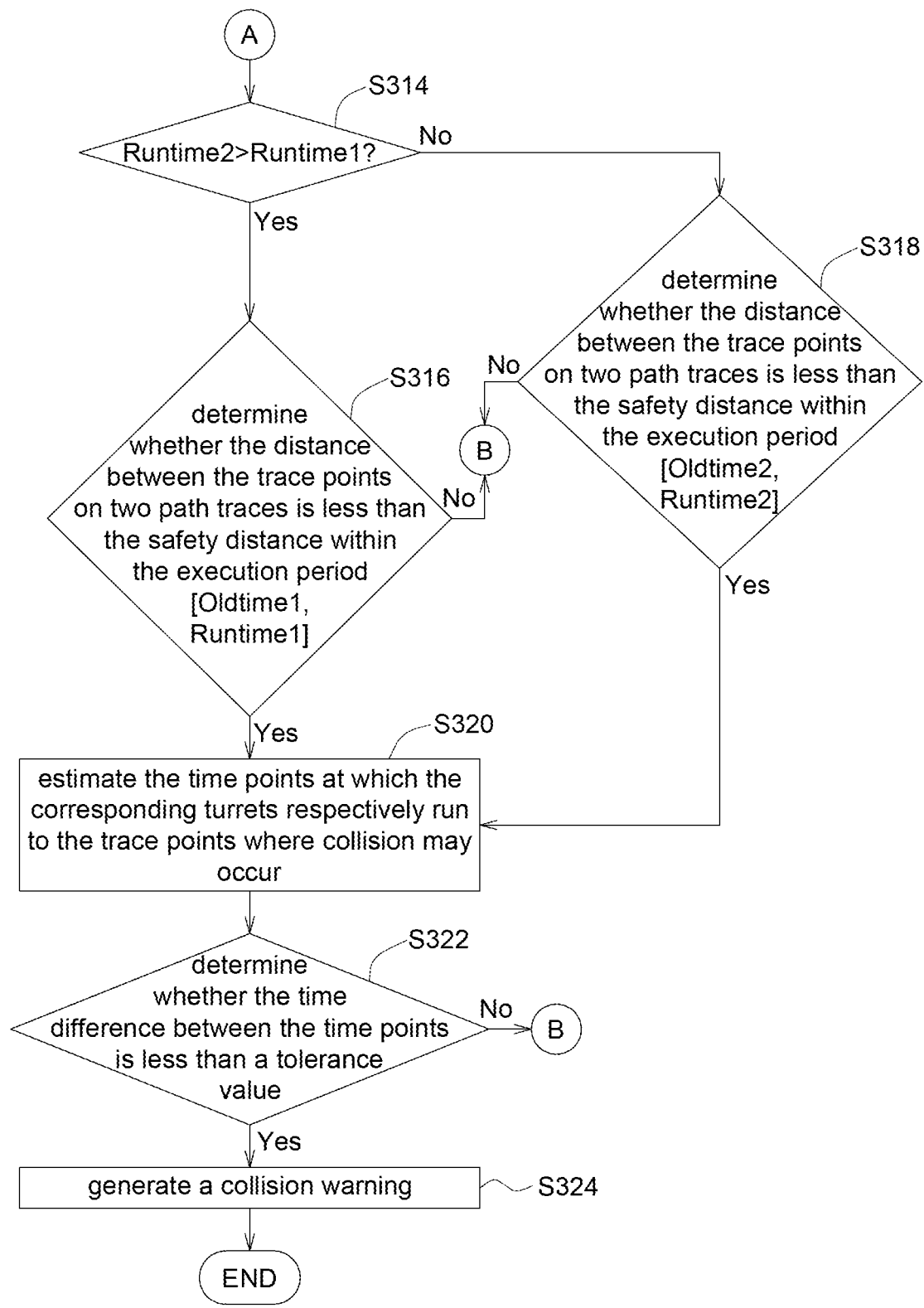
Figure 3C:
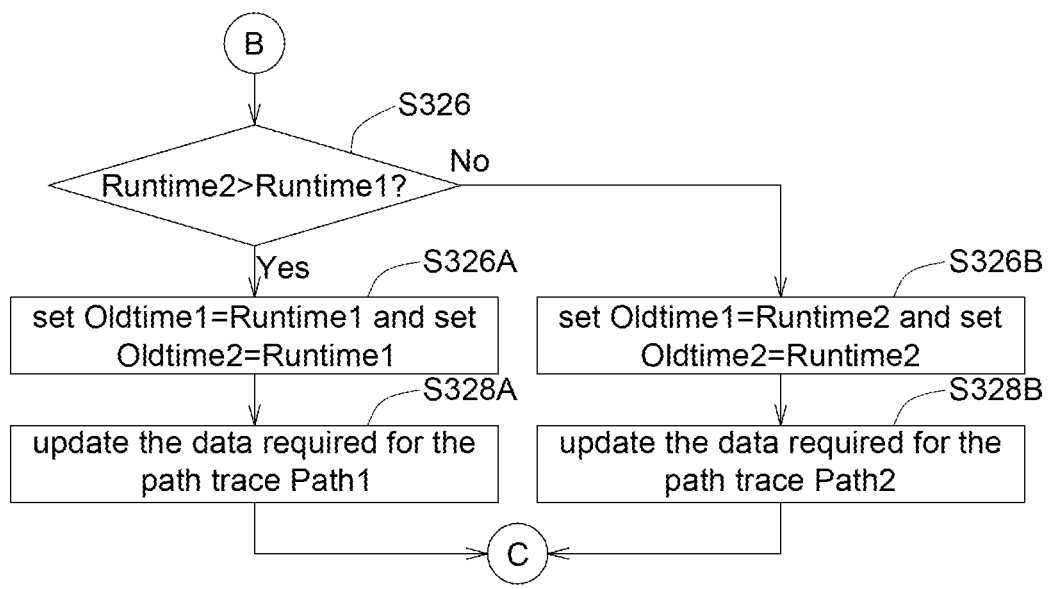

FIGS. 3A~3C show an example of a flowchart of a collision avoidance method for a double-turret machine tool. This example describes how the mechanism of collision avoidance for the two turrets TR1 and TR2 of the machine tool 102 is implemented by the collision avoidance system 100.

Refer to FIG. 3A. In step S302, the fast simulation unit 108 loads two processing codes with respect to the turrets TR1 and TR2 respectively.

In step S304, the fast simulation unit 108 plots a graph by way of fast simulation and creates the variable data corresponding to the two path traces Path1 and Path2 of the turrets TR1 and TR2.

Plotting the graph by way of fast simulation includes: directly linking the two nodes (that is, the starting point and the end point) of a session in a path trace. Let the path trace of linear motion be taken for example. The fast simulation unit 108 directly links the trace point at the beginning of a session and the trace point at the end of the session to plot the graph of a linear path trace. Since the trace point at the beginning of a session and the trace point at the end of the session are directly linked together, there is no need to obtain the trace points between the trace point at the beginning of a session and the trace point at the end of the session one by one by way of interpolation.

The variable data regarding the path trace of the turret TR1, for example, includes [Path1, Int1, POS1, Runtime1, Oldtime1], wherein Path1 denotes the index value of the path trace; Int1 denotes the data required for interpreting the corresponding processing code; POS1 denotes the trace point on the path trace Path1; Runtime1 denotes the end point parameter of the path trace Path1 for describing the end point of the execution period of the turret TR1 in a session; Oldtime1 denotes the start point parameter of the path trace Path1 used for describing the start point of the execution period of the turret TR1 in a session. Similarly, the variable data regarding the path trace of the turret TR2 includes [Path2, Int2, POS2, Runtime2, Oldtime2], wherein Path2 denotes the index value of the path trace; Int2 denotes the data required for interpreting the corresponding processing code; POS2 denotes the trace point on the path trace Path2; Runtime2 denotes the end point parameter of the path trace Path2 for describing the end point of the execution period of the turret TR2 in a session; Oldtime2 denotes the start point parameter of the path trace Path2 for describing the start point of the execution period of the turret TR2 in a session.

Before the simulation process starts, the fast simulation unit 108 initializes the time starting point parameters Oldtime1 and Oldtime2, for example, as: Oldtime1=0, Oldtime2=0.

In step S306, the fast simulation unit 108 starts to interpret and perform fast simulation according to the variable data of the path traces to execute for a session.

In step S308, the fast simulation unit 108 updates the data of each path trace. The update of path trace data is dependent on the progress of collision detection in current session. Details of step 308 are explained with reference to the process from node B to node C of FIG. 3C.

In step S310, the fast simulation unit 108 estimates the time required for the turret to run for a session according to the motion parameter group to obtain the values of Runtime1 and Runtime2, that is, the end points of the execution periods corresponding to different path traces. The motion parameter group includes one or more than one speed related parameter, such as the speed parameter and the acceleration parameter, with which the turret runs along path traces. The fast simulation unit 108 may obtain the motion parameter group from the machine tool 102.

In step S312, the fast simulation unit 108 sets a safety distance. When the distance between the trace points on two path traces is less than the safety distance, the two trace points are regarded as points at which collision may occur. The safety distance can be any value determined according to actual application. Following step S312, the method proceeds to node A.

Refer to FIG. 3B. Following node A, the method precedes to step S314, the collision avoidance unit 110 determines whether Runtime2 is greater than Runtime1. If the result of determination is positive, the method proceeds to step S316, the collision avoidance unit 110 determines whether the distance between the trace points on two path traces is less than the safety distance within the execution period [Oldtime1, Runtime1]. If the result of determination is negative, the method proceeds to step S318, the collision avoidance unit 110 determines whether the distance between the trace points on two path traces is less than the safety distance within the execution period [Oldtime2, Runtime2].

In other words, the collision avoidance unit 110 compares the length of the execution period [Oldtime1, Runtime1] with the length of the execution period [Oldtime2, Runtime2] to select a shorter one (the shortest execution period) and then determines whether the distance between the trace points on two path traces is less than the safety distance within the shortest execution period.

If the result of determination in step S316 or S318 is positive, which implies that the two path traces may collide in terms of the space, then the method proceeds to step S320 to perform collision detection in terms of the time. If the result of determination in step S316 or S318 is negative, which implies that the two path traces will not collide with each other, then the method proceeds to node B to update the data of the path traces. Details of node B will be explained with reference to FIG. 3C.

In step S320, the collision avoidance unit 110 estimates the time points at which the corresponding turrets respectively run to the points at which collision may occur. For example, when the distance between the first trace point POS1 on the path trace Path1 and the second trace point POS2 on the path trace Path2 is less than the safety distance, then the collision avoidance unit 110 estimates the first time point at which the turret TR1 runs to the first trace point POS1 and the second time point at which the turret TR2 runs to the second trace point POS2 according to the corresponding motion parameter groups.

In an embodiment, assume the simulation of the path trace Path1 uses the first motion parameter group and the simulation of the path trace Path2 uses the second motion parameter group. Then, within the shortest execution period, the collision avoidance unit 110 estimates a number of trace points the path trace Path1 within a number of checking time intervals according to the first motion parameter group, and estimates a number of trace points on the path trace Path2 within the checking time intervals according to the second motion parameter group. The collision avoidance unit 110 compares the distance between the trace point on the path trace Path1 and the trace point on the path trace Path2 and detects two trace points at which collision may occur: the first trace point POS1 and the second trace point POS2.

The length of the checking time interval can be any value. In an embodiment, the collision avoidance unit 110 can set the length of each checking time interval as 200 milliseconds.

In step S322, the collision avoidance unit 110 determines whether the time difference between the time points is less than a tolerance value. For example, the collision avoidance unit 110 determines whether the difference between the first time point and the second time point is less than the tolerance value. If the result of determination is positive, which implies that the two turrets TR1 and TR2 may collide with each other, then the method proceeds to step S324, the collision avoidance unit 110 generates a collision warning to warn the operator of relevant collision information, such as possible collision positions or session numbers, so that the user can edit the processing codes/programming code and terminate simulation. If the result of determination in step S322 is negative, which implies that the two path traces will not collide, then the method proceeds to node B to update the data of the path traces.

Refer to FIG. 3C. Following node B, the method proceeds to step S326, the fast simulation unit 108 determines whether the end point parameter Runtime2 is greater than the end point parameter Runtime1. If the result of determination is positive, which implies that the execution period [Oldtime1, Runtime1] is the shortest execution period, then, the method proceeds to step S326A, the fast simulation unit 108 sets the start point parameter of each execution period as Runtime1, that is, Oldtime1=Runtime1, Oldtime2=Runtime1. Then, the method proceeds to step S328A to update the data required for the path trace Path1. If the result of determination is negative, which implies that the execution period [Oldtime2, Runtime2] is the shortest execution period, then the method proceeds to step S326B, the fast simulation unit 108 sets the start point parameter of each execution period as Runtime2, that is, Oldtime1=Runtime2, Oldtime2=Runtime2. Then, the method proceeds to step S328B to update the data required for the path trace Path2.

For example, assume the execution period within which the turret TR1 runs along the path trace Path1 in the first session is 0~5 seconds (Oldtime1=0; Runtime1=5), and the execution period within which the turret TR2 runs along the path trace Path2 in the first session is 0~10 seconds (Oldtime2=0; Runtime2=10). After completing collision detection with respect to 0~5 seconds of the execution period, the fast simulation unit 108 loads the processing code for the second session with respect to the turret TR1, and updates the data of the path traces accordingly. Assume the execution period within which the turret TR1 runs along the path trace Path1 in the second session is 5~15 seconds. Then, the fast simulation unit 108 sets the parameters as [Oldtime1=5, Runtime1=10], [Oldtime2=5, Runtime2=10], and performs collision detection with respect to the part of the path trace Path2 not detected in the first session (5~10 seconds), and the part of the path trace Path1 corresponding to the execution period (5~10 seconds).

Following steps S328A and S328B, the method proceeds to node C, and then returns to step S308 of FIG. 3A.

Figure 4:
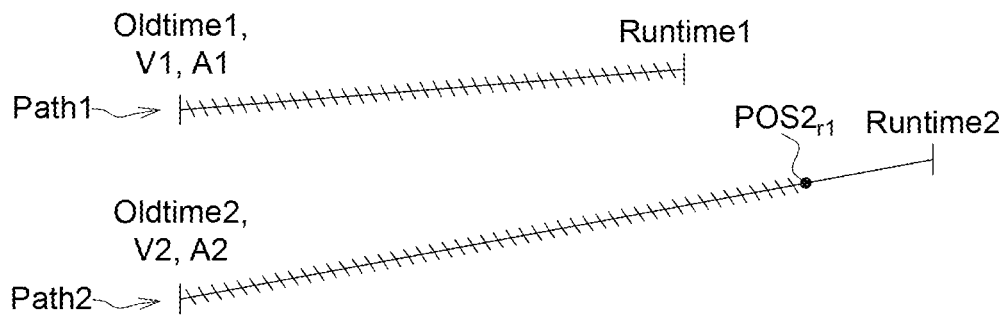
FIG. 4 shows a schematic diagram of safety distance detection for two path traces.

FIG. 4 shows a schematic diagram of safety distance detection for two path traces. Based on the simulation of FIG. 4, the start point parameter of the turret TR1 at the beginning of the session is Oldtime1, and the end point parameter of the turret TR1 running to the end of the session along the path trace Path1 at a speed value V1 and an acceleration value A1 is Runtime1; the start point parameter of the turret TR2 at the beginning of the session is Oldtime2, and the end point parameter of the turret TR2 running to the end of the session along the path trace Path2 at a speed value V2 and an acceleration value A2 is Runtime2.

Assume the Runtime2 is greater than Runtime1, and the trace point of the turret TR2 at time point Runtime1 is $POS2_{r1}$. Then, the collision avoidance unit 110 detects whether the distance between the trace points on the path trace Path1 within the execution period [Oldtime1, Runtime1] and the trace points on the path trace Path2 within the execution period [Oldtime2, Runtime1] is less than the safety distance as indicated by the segments with slashes in FIG. 4, wherein the start point parameters Oldtime1 is equal to Oldtime2.

Figure 5:
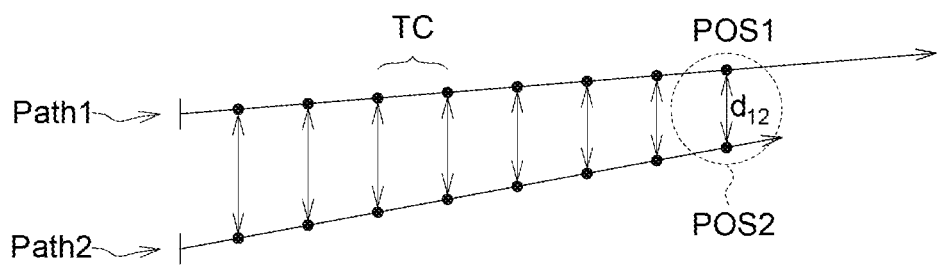
FIG. 5 shows a schematic diagram of collision detection for two path traces.

FIG. 5 shows a schematic diagram of collision detection for two path traces. Based on the simulation of FIG. 5, if the distance d12 between the trace point on the path trace Path1 POS1 and the trace point on the path trace Path2 POS2 is less than the safety distance, which implies that the two trace points POS1 and POS2 are points at which collision may occur, then the collision avoidance unit 110 further calculates the time information corresponding to the two trace points POS1 and POS2.

For example, assume the checking time interval TC is 200 milliseconds. Then, the collision avoidance unit 110 estimates the trace point on each of the path traces Path1 and Path2 every 200 milliseconds according to the speed values V1 and V2 and the acceleration values A1 and A2 of the path traces Path1 and Path2, and estimates the trace points POS1 and POS2 that are separated by a distance less than the safety distance.

Then, the time information of the two trace points POS1 and POS2 can be obtained from the kinematic function as below:

$$X = V \times t + \tfrac{1}{2} \times A \times t^2 \quad \text{(formula 1)}$$

Wherein X denotes the value of the trace point; V denotes the speed; t denotes the time; A denotes the acceleration.

By substituting the motion parameters of the trace point POS1 and the path trace Path1 to formula 1, the trace point POS1 can be obtained by formula 2 as below:

$$POS1 = V1 \times T1 + \tfrac{1}{2} A1 \times T1^2 \quad \text{(formula 2)}$$

Wherein T1 denotes the time point at which the turret runs to the trace point POS1.

By substituting the motion parameters of the trace point POS2 and the path trace Path2 to formula 1, the trace point POS2 can be obtained by formula 3 as below:

$$POS2 = V2 \times T2 + \tfrac{1}{2} A2 \times T2^2 \quad \text{(formula 3)}$$

Wherein T2 denotes the time point at which the turret runs to the trace point POS2.

The collision avoidance unit 110 can obtain the values of the time points T1 and T2 by formulas 2 and 3 respectively. If the difference between the time points T1 and T2 is less than a tolerance value (such as 10 milliseconds), which implies that the two path traces may collide, then the collision avoidance unit 110 sends a collision warning.

It should be understood that the above example is merely one of the embodiments of the present disclosure, and is not for limiting the present disclosure. The path traces are not limited to straight lines, and can also be curves as long as the collision avoidance unit 110 can estimate the time points corresponding to the trace points according to the curve function and related motion parameters.

Figure 6A:
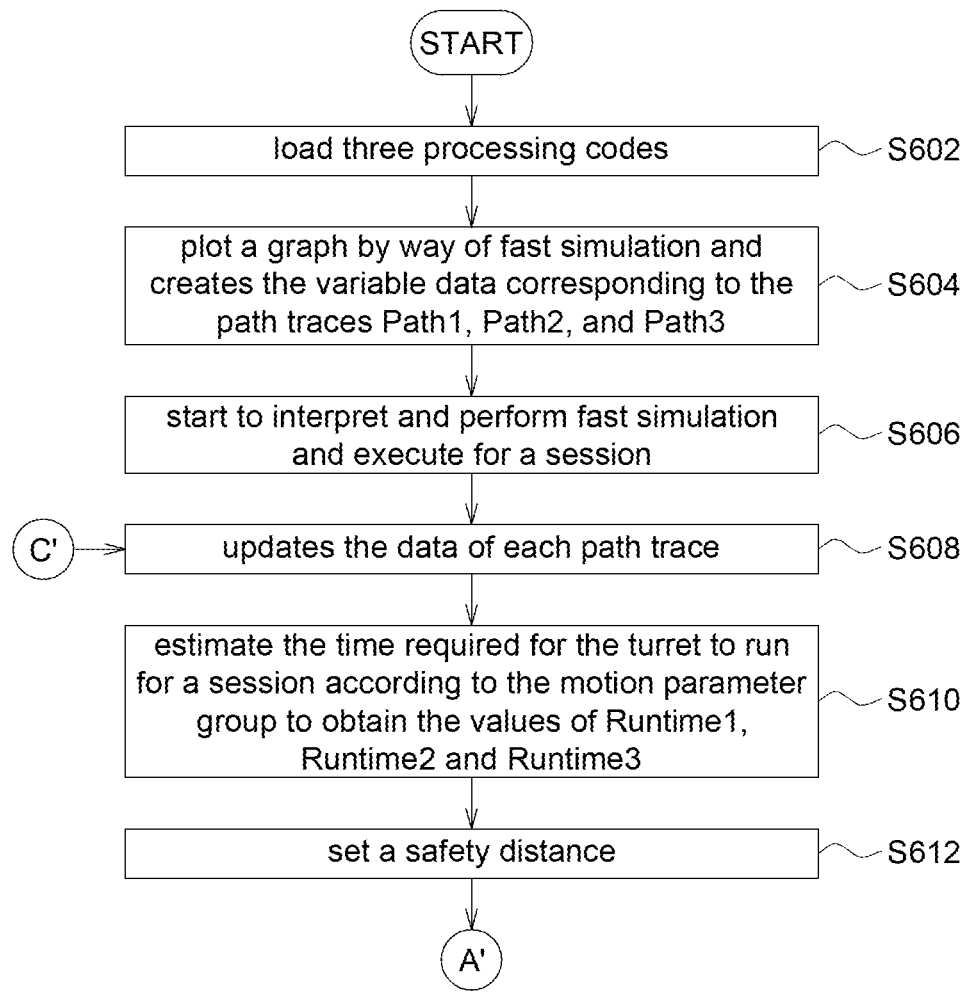
FIG. 6A~FIG. 6C show an example of a flowchart of a collision avoidance method adapted for a triple-turret machine tool.
Figure 6B:
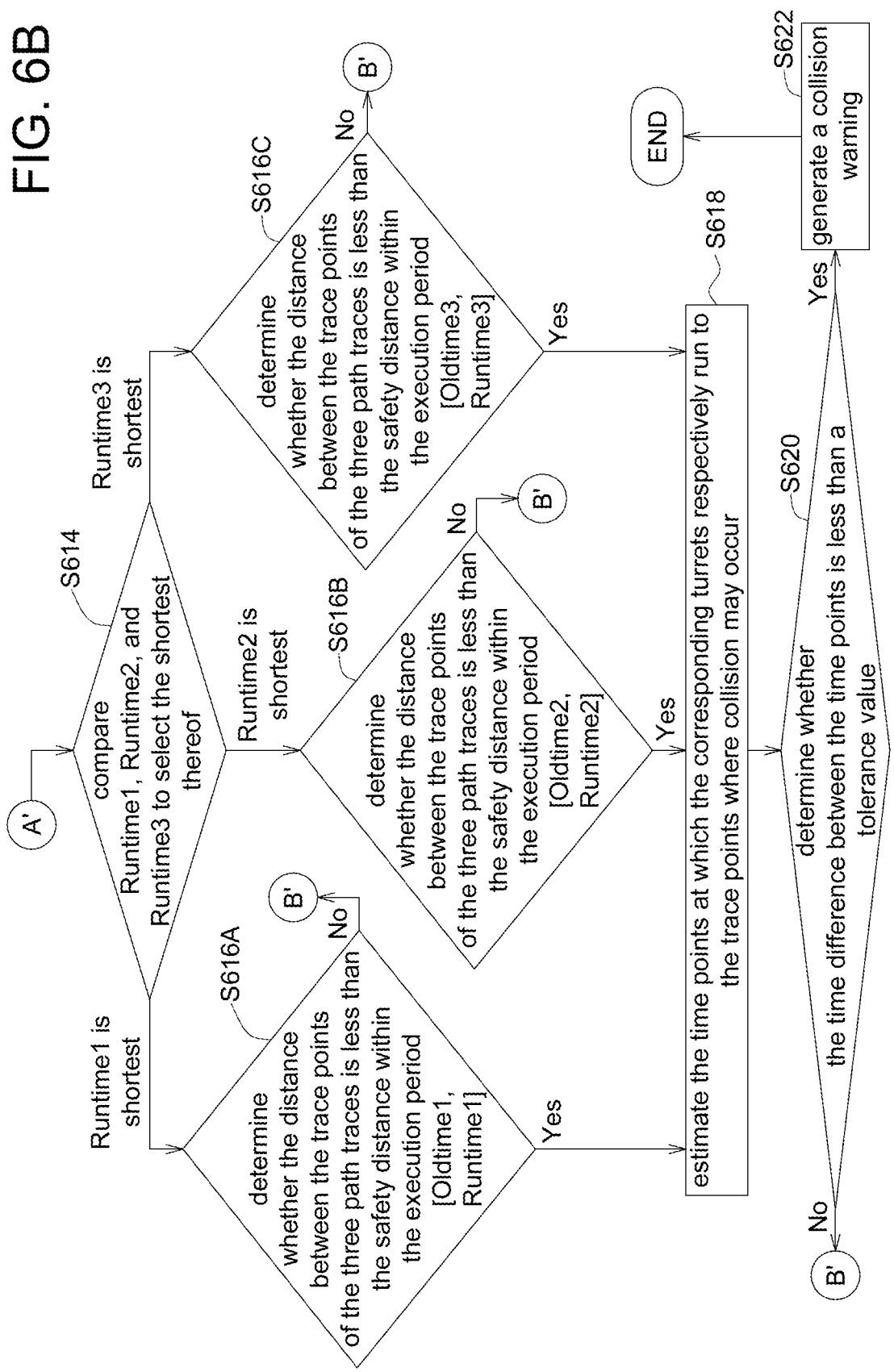
Figure 6C:
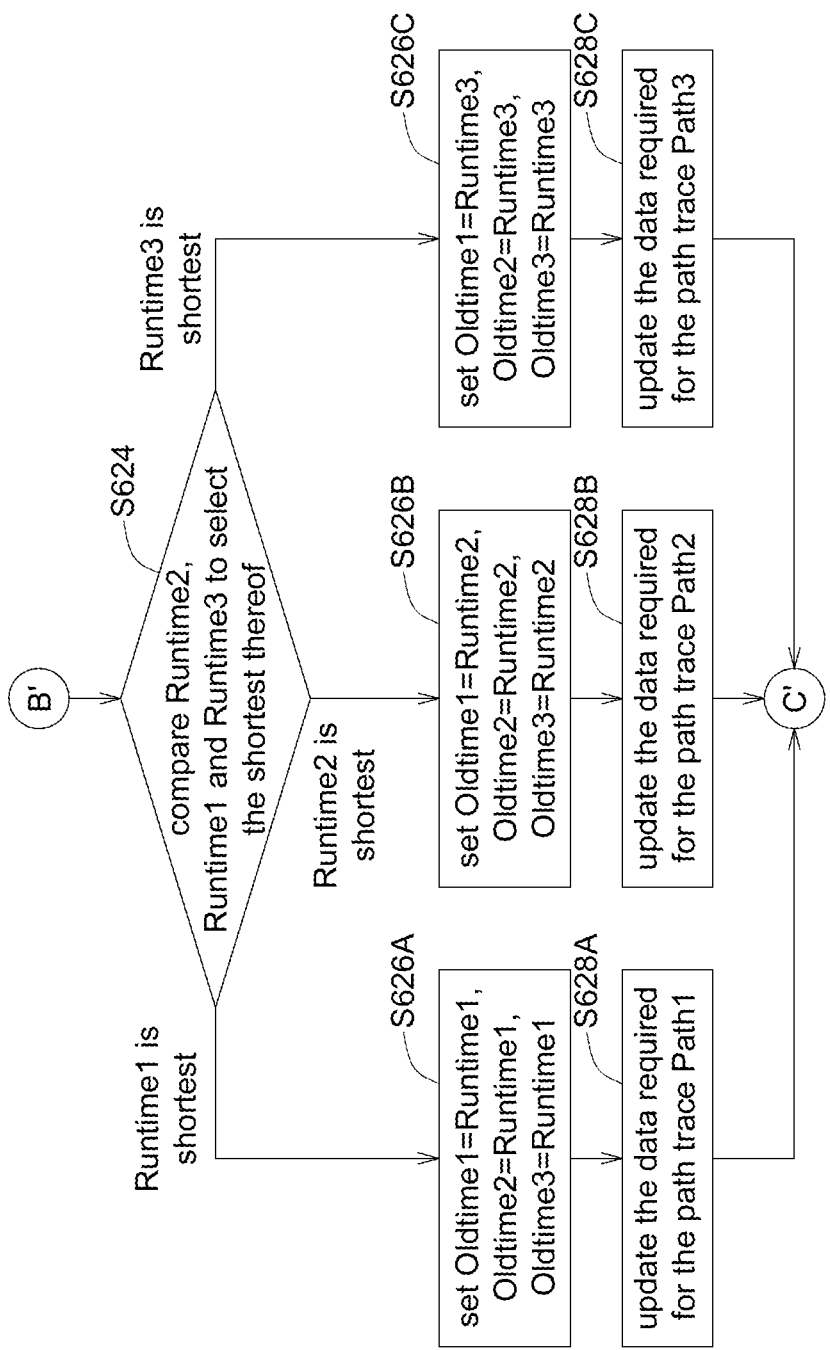

FIG. 6A~FIG. 6C show an example of a flowchart of a collision avoidance method adapted for a triple-turret machine tool. The present example describes how the mechanism of collision avoidance for three turrets TR1 and TR2 and TR3 of the machine tool 102 is implemented by the collision avoidance system 100.

Refer to FIG. 6A. In step S602, the fast simulation unit 108 loads three processing codes with respect to the turrets TR1 and TR2 and TR3 respectively.

In step S604, the fast simulation unit 108 plots a graph by way of fast simulation and creates the variable data corresponding to the three path traces Path1, Path2 and Path3 of the turrets TR1 and TR2 and TR3.

The variable data regarding the path trace of the turret TR1, for example, includes [Path1, Int1, POS1, Runtime1, Oldtime1], wherein Path1 denotes the index value of the path trace; Int1 denotes the data required for interpreting the corresponding processing code; POS1 denotes the trace point on the path trace Path1 corresponding to the turret TR1; Runtime1 denotes the end point parameter used for describing the end point of the execution period of the turret TR1 in a session; Oldtime1 denotes the start point parameter used for describing the start point of the execution period of the turret TR1 in a session. The variable data regarding the path trace of the turret TR2 includes [Path2, Int2, POS2, Runtime2, Oldtime2], wherein Path2 denotes the index value of the path trace; Int2 denotes the data required for interpreting the corresponding processing code; POS2 denotes the trace point on the path trace Path2 corresponding to the turret TR2; Runtime2 denotes the end point parameter used for describing the end point of the execution period of the turret TR2 in a session; Oldtime2 denotes the start point parameter used for describing the start point of the execution period of the turret TR2 in a session. The variable data regarding the path trace of the turret TR3 includes [Path3, Int3, POS3, Runtime3, Oldtime3], wherein Path3 denotes the index value of the path trace; Int3 denotes the data required for interpreting the corresponding processing code; POS3 denotes the trace point on the path trace Path3 corresponding to the turret TR3; Runtime3 denotes the end point parameter used for describing the end point of the execution period of the turret TR3 in a session; Oldtime3 denotes the end point parameter used for describing the start point of the execution period of the turret TR3 in a session.

Before the simulation process starts, the fast simulation unit 108 initializes the time starting point parameter Oldtime1, Oldtime2, Oldtime3 as: Oldtime1=0, Oldtime2=0, Oldtime3=0.

In step S606, the fast simulation unit 108 starts to interpret and perform fast simulation according to the variable data of the path traces to execute for a session.

In step S608, the fast simulation unit 108 updates the data of each path trace. The update of path trace data is dependent on the progress of collision detection in current session.

Details of step 608 are explained with reference to the process from node B' to node C' of FIG. 6C.

In step S610, the fast simulation unit 108 estimates the time required for the turret to run for a session according to the motion parameter group to obtain the values of Runtime1, Runtime2 and Runtime3.

In step S612, the fast simulation unit 108 sets a safety distance. When the distance between the trace points of any two path traces is less than the safety distance, the two trace points are regarded as points at which collision may occur. The safety distance can be any value determined according to actual application. Following step S612, the method proceeds to node A'.

Refer to FIG. 6B. Following node A', the method proceeds to step S614, the collision avoidance unit 110 compares Runtime1, Runtime2 and Runtime3 to select the shortest thereof. If Runtime1 is the shortest, then the method proceeds to step S616A, the collision avoidance unit 110 determines whether the distance between the trace points of any two of the three path traces is less than the safety distance within the execution period [Oldtime1, Runtime1]. If Runtime2 is the shortest, then the method proceeds to step S616B, the collision avoidance unit 110 determines whether the distance between the trace points of any two of the three path traces is less than the safety distance within the execution period [Oldtime2, Runtime2]. If Runtime3 is the shortest, then the method proceeds to step S616C, the collision avoidance unit 110 determines whether the distance between the trace points of any two of the three path traces is less than the safety distance within the execution period [Oldtime3, Runtime3].

In other words, the collision avoidance unit 110 compares the execution periods [Oldtime1, Runtime1], [Oldtime2, Runtime2] and [Oldtime3, Runtime3] to select the shortest execution period and then determines whether the distance between the trace points on any two path traces is less than the safety distance within the shortest execution period.

If the result of determination in steps S616A, S616B or S616C is positive, which implies that the path traces may collide in terms of the space, then the method proceeds to step S618 to perform collision detection in terms of the time. If the result of determination in steps S616A, S616B or S616C is negative, which implies that the path traces will not collide, then the method proceeds to node B' to update the data of the path traces. Details of node B' will be explained with reference to FIG. 6C.

In step S618, the collision avoidance unit 110 estimates the time points at which the corresponding turrets respectively run to the points at which collision may occur. For example, when the distance between the first trace point POS1 on the path trace Path1 and the third trace point POS3 on the path trace Path3 is less than the safety distance, the collision avoidance unit 110 estimates the first time point at which the turret TR1 runs to the first trace point POS1 and the third time point at which the turret TR3 runs to the third trace point POS3 according to the corresponding motion parameter group.

In step S620, the collision avoidance unit 110 determines whether the time difference between the time points is less than a tolerance value. For example, the collision avoidance unit 110 determines whether the time difference between the first time point and the third time point is less than the tolerance value. If the result of determination is positive, which implies that the two turrets TR1 and TR3 may collide with each other, then the method proceeds to step S622, the collision avoidance unit 110 generates a collision warning to warn the operator of relevant collision information. If the result of determination in steps step S622 is negative, which implies that the three path traces will not collide, then the method proceeds to node B' to update the data of the path traces.

Refer to FIG. 6C. Following step B', the method proceeds to step S624, the fast simulation unit 108 compares Runtime2, Runtime1 and Runtime3 to select the shortest thereof. If Runtime1 is the shortest, which implies that the execution period [Oldtime1, Runtime1] is the shortest execution period, then the method proceeds to step S626A, and the fast simulation unit 108 sets the start point parameter of each execution period as Runtime1, that is, Oldtime1=Runtime1, Oldtime2=Runtime1, Oldtime3=Runtime1. Then, the method proceeds to step S628A to update the data required for the path trace Path1.

If Runtime2 is the shortest, which implies that the execution period [Oldtime2, Runtime2] is the shortest execution period, then the method proceeds to step S626B, and the fast simulation unit 108 sets the start point parameter of each execution period as Runtime2, that is, Oldtime1=Runtime2, Oldtime2=Runtime2, Oldtime3=Runtime2. Then, the method proceeds to step S628B to update the data required for the path trace Path2.

Similarly, if Runtime3 is the shortest, which implies that the execution period [Oldtime3, Runtime3] is the shortest execution period, then the method proceeds to step S626C, and the fast simulation unit 108 sets the start point parameter of each execution period as Runtime3, that is, Oldtime1=Runtime3, Oldtime2=Runtime3, Oldtime3=Runtime3. Then, the method proceeds to step S628C to update the data required for the path trace Path3.

For example, assume the execution period within which the turret TR1 runs along the path trace Path1 in the first session is 0~5 seconds (Oldtime1=0; Runtime1=5), the execution period within which the turret TR2 runs along the path trace Path2 in the first session is 0~10 seconds (Oldtime2=0; Runtime2=10), and the execution period within which the turret TR3 runs along the path trace Path3 in the first session is 0~12 seconds (Oldtime3=0; Runtime3=12). After completing collision detection with respect to 0~5 seconds of the shortest execution period, the fast simulation unit 108 loads the processing code for the second session with respect to the turret TR1, and updates the data of the path traces accordingly. Assume the execution period within which the turret TR1 runs along the path trace Path1 in the second session is 5~15 seconds. Then, the fast simulation unit 108 sets [Oldtime1=5, Runtime1=15], [Oldtime2=5, Runtime2=10], [Oldtime3=5, Runtime2=12], and performs collision detection with respect to the parts of the path traces Path1, Path2 and Path3 not detected in the first session.

Following steps S628A, S628B, S628C, the method proceeds to node C' and then returns to step S608 of FIG. 6A.

Figure 7:
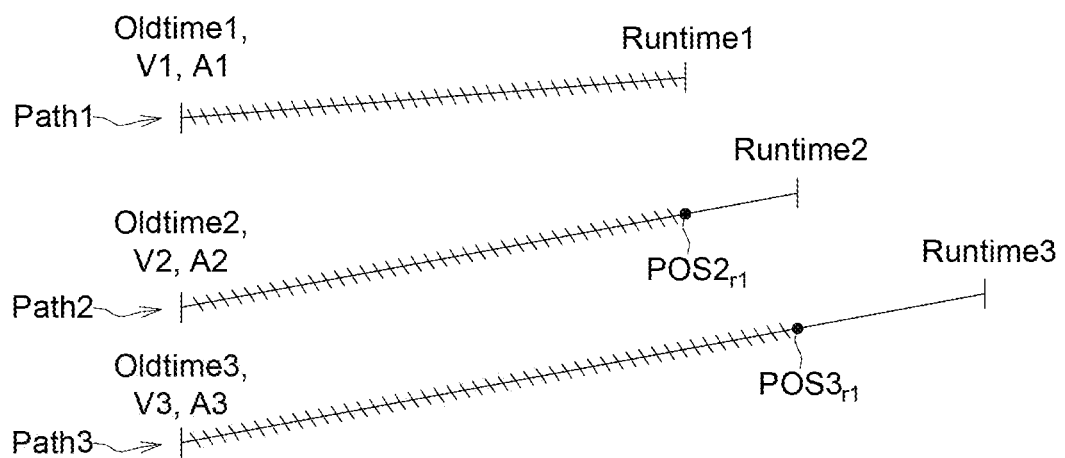
FIG. 7 shows a schematic diagram of safety distance detection for two path traces.

FIG. 7 shows a schematic diagram of collision detection for three path traces. Based on the simulation of FIG. 7, the start point parameter of the turret TR1 at the beginning of the session is Oldtime1, and the end point parameter of the turret TR1 running to the end of the session along the path trace Path1 at a speed value V1 and an acceleration value A1 is Runtime1; the start point parameter of the turret TR2 at the beginning of the session is Oldtime2, and the end point parameter of the turret TR2 running to the end of the session along the path trace Path2 at a speed V2 and an acceleration A2 is Runtime2; the start point parameter of the turret TR3 at the beginning of the session is Oldtime3, and the end point parameter of the turret TR3 running to the end of the session along the path trace Path3 at a speed V3 and an acceleration A3 is Runtime3. In other words, the execution period of the path trace Path1 is [Oldtime1, Runtime1], the execution period of the path trace Path2 is [Oldtime2, Runtime2], and the execution period of the path trace Path3 is [Oldtime3, Runtime3].

Assume the trace points of the turrets TR2 and TR3 at time point Runtime1 are $POS2_{r1}$ and $POS3_{r1}$, respectively. Then, the collision avoidance unit 110 detects whether the distance between the trace points on the path traces Path1, Path2 and Path3 respectively is less than the safety distance within the execution period [Oldtime1, Runtime1], [Oldtime2, Runtime1] and [Oldtime3, Runtime1] as indicated by the segments with slashes in FIG. 4.

Figure 8:
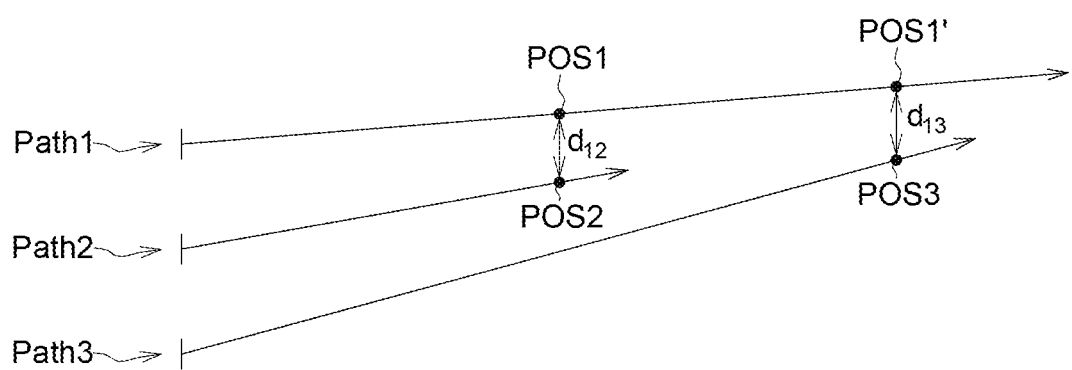
FIG. 8 shows a schematic diagram of collision detection for two path traces.

FIG. 8 shows a schematic diagram of collision detection for two path traces. Based on the simulation of FIG. 8, when the distance $d_{12}$ between the trace point POS1 on the path trace Path1 and the trace point POS2 on the path trace Path2 is less than the safety distance and the distance $d_{13}$ between the trace point POS1' on the path trace Path1 and the trace point POS3 on the path trace Path3 is less than the safety distance, the collision avoidance unit 110 calculates the time information corresponding to the trace points POS1, POS2, POS1' and POS3.

For example, the time information of the trace points POS1, POS2, POS1' and POS3 can be obtained by formula 1, wherein the time point T1 at which the turret TR1 runs to the trace point POS1 can be obtained by formula 2, and the time point T2 at which the turret TR2 runs to the trace point POS2 can be obtained by formula 2. The time point T1' at which the turret TR1 runs to the trace point POS1' can be obtained by formula 4 below:

$$POS1'=V1 \times T1'+\tfrac{1}{2}A1 \times T1'^2 \qquad \text{(formula 4)}$$

The time point T3 at which the turret TR3 runs to the trace point POS3 can be obtained by formula 5 below:

$$POS3=V3 \times T3+\tfrac{1}{2}A3 \times T3^2 \qquad \text{(formula 5)}$$

The collision avoidance unit 110 compares the values of the time points T1 and T2. If the difference between the time points T1 and T2 is less than a tolerance value, which implies that the path traces Path1 and Path2 may collide, then the collision avoidance unit 110 sends a collision warning. The collision avoidance unit 110 also compares the values of the time points T1' and T3. If the difference between the time points T1' and T3 is less than the tolerance value, which implies that the path trace Path1 and Path3 may collide, then the collision avoidance unit 110 also sends a collision warning.

Figure 9:
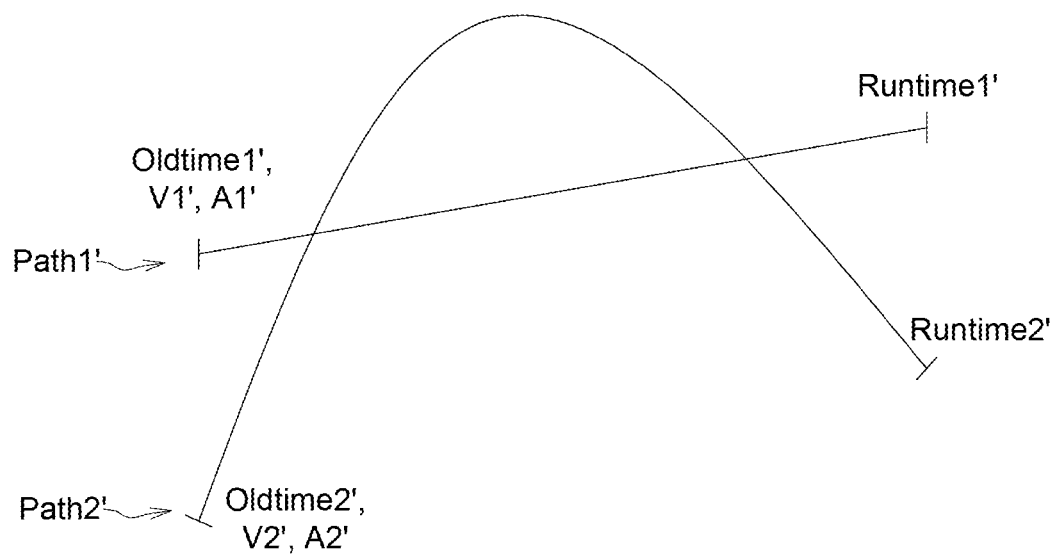
FIG. 9 shows a schematic diagram of collision avoidance for two path traces according to an embodiment of the present disclosure.

FIG. 9 shows a schematic diagram of collision avoidance for two path traces according to an embodiment of the present disclosure. According to the embodiment of FIG. 9, collision detection is performed on the two path traces Path1' and Path2', wherein the path trace Path1' is a linear trace, and the path trace Path2' is a curve trace. The start point parameter of the turret corresponding to the path trace Path1' is Oldtime1', and the end point parameter of the corresponding turret running to the end of the session along the path trace Path1' at a speed value V1' and an acceleration value A1' is Runtime1'. The start point parameter of the turret corresponding to the path trace Path2' is Oldtime2', and the end point parameter of the corresponding turret running to the end of the session along the path trace Path2' at a speed value V2' and an acceleration value A2' is Runtime2'.

The collision avoidance unit 110 determines whether the two path traces Path1' and Path2' may collide according to the motion parameter group (such as V1', A1', V2', A2') of each path trace as well as the linear kinematic function describing path trace Path1' and the curve kinematic function describing the path trace Path2' by the mechanism of determination similar to that of FIGS. 4~5 or FIGS. 7~8.

Figure 10:
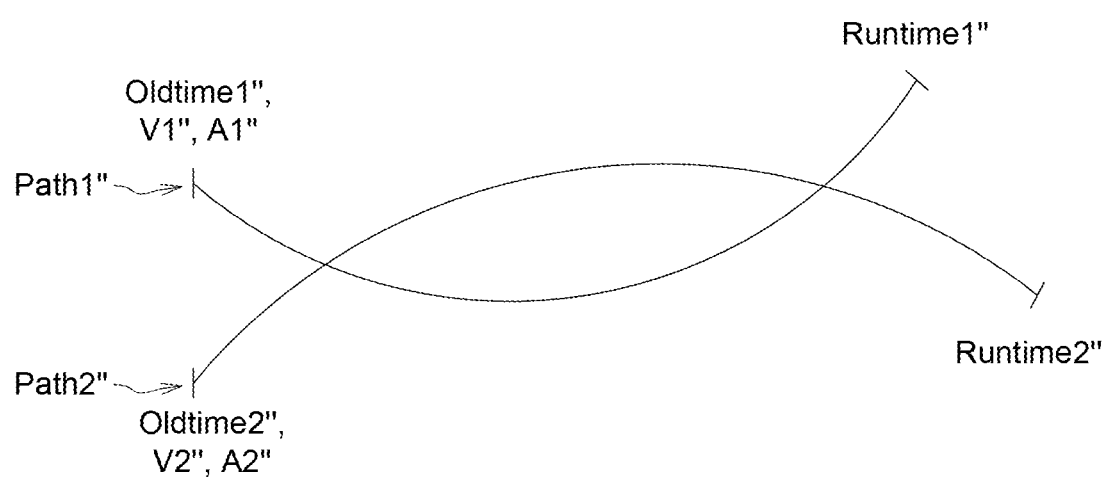
FIG. 10 shows a schematic diagram of collision avoidance for two path traces according to an embodiment of the present disclosure.

FIG. 10 shows a schematic diagram of collision avoidance for two path traces according to another embodiment of the present disclosure.

According to the embodiment of FIG. 10, collision detection is performed on two path traces Path1" and Path2" both being curve traces. The start point parameter of the turret corresponding to the path trace Path1' is Oldtime1', and the end point parameter of the corresponding turret running to the end of the session along the path trace Path1" at a speed Value V1' and an acceleration value A1" is Runtime1". The start point parameter of the turret corresponding to the path trace Path2" is Oldtime2", and the end point parameter of the corresponding turret running to the end of the session along the path trace Path2" at a speed value V2" and an acceleration value A2" is Runtime2".

The collision avoidance unit 110 determines whether the two path traces Path1" and Path2" may collide according to the motion parameter group (such as V1", A1", V2", A2") of each path trace as well as the curve kinematic function describing path traces Path1" Path2" by the mechanism of determination similar to that of FIGS. 4~5 or FIGS. 7~8.

The machine tool collision avoidance method of the present disclosure can be implemented as one or more than one programming code, which can be stored in a non-transitory computer readable storage medium, such as a hard disc, a CD, a pen drive, or a memory. The machine tool collision avoidance method of the present disclosure can be executed when the processing circuit loads a software program from the non-transitory computer readable storage medium. Any person ordinary skilled in the technology of the present invention will understand that the steps of the method disclosed in the embodiments of the present disclosure, unless otherwise specified, can exchange their orders according to actual needs, and some or all of the steps can be executed concurrently.

To summarize, a machine tool collision avoidance method and a system using the same are disclosed in the embodiments of the present disclosure. Whether the distance between the path traces of turrets is less than a safety distance is detected by way of fast simulation. If yes, the time points of the trace points at which the turret may collide are calculated to evaluate whether the turrets may collide or not. According to the method and system of the present disclosure, collision detection can be performed on multiple path traces of the turrets during fast simulation, and the execution of one single session is quicker than actual interpolation or idle run, such that the user's preparation time before the processing can be saved.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A machine tool collision avoidance method applicable to a machine tool having a plurality of turrets, wherein the method comprises following steps and is executed by a processing circuit:
   (a) loading a plurality of processing codes corresponding to the operation of the turrets in a first session;
   (b) simulating a plurality of path traces corresponding to the processing codes;
   (c) estimating a plurality of execution periods within which the turrets run along the path traces;

(d) selecting a shortest execution period from the plurality of execution periods;
(e) determines whether the distance between the trace points on any two of the path traces is less than a safety distance within the shortest execution period;
(f) if the distance between a first trace point on a first path trace of the path traces and a second trace point on a second path trace of the path traces is less than the safety distance, estimating a first time point at which a first turret of the turrets runs to the first trace point and a second time point at which the second turret of the turrets runs to the second trace point; and
(g) determining whether the difference between the first time point and the second time point is lower than a tolerance value; and
(h) generating a collision warning if the difference between the first time point and the second time point is lower than the tolerance value.

2. The machine tool collision avoidance method according to claim 1, further comprising:
setting a plurality of start point parameters respectively indicating the start points of the execution periods;
obtaining a plurality of motion parameter groups with which the turrets run along the path traces;
estimating the time required for the turrets to run along the path traces according to the motion parameter groups to set a plurality of end point parameters respectively indicating the end points of the execution periods.

3. The machine tool collision avoidance method according to claim 2, wherein the start point of the shortest execution period is defined by a specific start point parameter of the start point parameters, the end point of the shortest execution period is defined by a specific end point parameter of the start point parameters, and the machine tool collision avoidance method further comprises:
executing a trace data updating procedure to update the execution periods if the result of determination in step (e) or step (g) is negative, wherein the trace data updating procedure comprises:
updating the start points of the execution periods parameters as the specific end point parameter;
loading another processing code used for describing the operation of a specific turret of the turrets in a second session, wherein the time required for the specific turret to complete the operation of the first session corresponds to the shortest execution period; and
estimating the time required for the specific turret to complete the operation of the second session and updating the specific end point parameter according to the estimated time.

4. The machine tool collision avoidance method according to claim 3, further comprising:
updating the shortest execution period as the shortest of the updated execution periods.

5. The machine tool collision avoidance method according to claim 2, wherein the simulation of the first path trace uses a first motion parameter group of the motion parameter groups, the simulation of the second path trace uses a second motion parameter group of the motion parameter groups, and the machine tool collision avoidance method further comprises:
estimating a plurality of trace points on the first path trace at a plurality of checking time intervals within the shortest execution period according to the first motion parameter group;
estimating a plurality of trace points on the second path trace at the checking time intervals within the shortest execution period according to the second motion parameter group; and
comparing the distance between the trace points on the first path trace with the trace points on the second path trace to detect the first trace point and the second trace point from the trace points on the first path trace and the trace points on the second path trace respectively.

6. The machine tool collision avoidance method according to claim 5, wherein each checking time interval is 200 milliseconds.

7. The machine tool collision avoidance method according to claim 2, wherein each motion parameter group comprises at least one speed parameter and at least one acceleration parameter.

8. The machine tool collision avoidance method according to claim 2, further comprising:
estimating the first time point according to the position of the first trace point, a first motion parameter group with which the first turret runs along the first path trace, and a first kinematic function used for describing the first path trace; and
estimating the second time point according to the position of the second trace point, a second motion parameter group with which the second turret runs along the second path trace, and a second kinematic function used for describing the second path trace.

9. The machine tool collision avoidance method according to claim 8, wherein the first kinematic function and the second kinematic function comprise at least one of a linear kinematic function and a curve kinematic function.

10. The machine tool collision avoidance method according to claim 1, wherein the path traces respectively denote the tip point traces of the turrets.

11. A collision avoidance system, applicable to a machine tool having a plurality of turrets, comprising:
a memory; and
a processing circuit coupled to the memory for executing following steps of:
(a) loading a plurality of processing codes corresponding to the operation of the turrets in a first session;
(b) simulating a plurality of path traces corresponding to the processing codes;
(c) estimating a plurality of execution periods within which the turrets run along the path traces;
(d) selecting a shortest execution period from the execution periods;
(e) determines whether the distance between the trace points on any two of the path traces is less than a safety distance within the shortest execution period;
(f) if the distance between a first trace point on a first path trace of the path traces and a second trace point on a second path trace of the path traces is less than the safety distance, estimating a first time point at which a first turret of the turrets runs to the first trace point and a second time point at which the second turret of the turrets runs to the second trace point; and
(g) determining whether the difference between the first time point and the second time point is lower than a tolerance value; and
(h) generating a collision warning if the difference between the first time point and the second time point is lower than the tolerance value.

12. The collision avoidance system according to claim 11, wherein the processing circuit is further used for:

setting a plurality of start point parameters respectively indicating the start points of the execution periods;

obtaining a plurality of motion parameter groups with which the turrets run along the path traces;

estimating the time required for the turrets to run along the path traces according to the motion parameter groups to set a plurality of end point parameters respectively indicating the end points of the execution periods.

13. The collision avoidance system according to claim 12, wherein the start point of the shortest execution period is defined by a specific start point parameter of the start point parameters, the end point of the shortest execution period is defined by a specific end point parameter of the start point parameters, and the processing circuit is further used for:

executing a trace data updating procedure to update the execution periods if the result of determination in step (e) or step (g) is negative, wherein the trace data updating procedure comprises:

updating the start points of the execution periods parameters as the specific end point parameter;

loading another processing code used for describing the operation of a specific turret of the turrets in a second session, wherein the time required for the specific turret to complete the operation of the first session corresponds to the shortest execution period; and estimating the time required for the specific turret to complete the operation of the second session and updating the specific end point parameter according to the estimated time.

14. The collision avoidance system according to claim 13, wherein the processing circuit is further used for:

updating the shortest execution period as the shortest of the updated execution periods.

15. The collision avoidance system according to claim 12, wherein the simulation of the first path trace uses a first motion parameter group of the motion parameter groups, the simulation of the second path trace uses a second motion parameter group of the motion parameter groups, and the processing circuit is further used for:

estimating a plurality of trace points on the first path trace at a plurality of checking time intervals within the shortest execution period according to the first motion parameter group;

estimating a plurality of trace points on the second path trace at the checking time intervals within the shortest execution period according to the second motion parameter group; and comparing the distance between the trace points on the first path trace with the trace points on the second path trace to detect the first trace point and the second trace point from the trace points on the first path trace and the trace points on the second path trace respectively.

16. The collision avoidance system according to claim 15, wherein each checking time interval is 200 milliseconds.

17. The collision avoidance system according to claim 12, wherein each motion parameter group comprises at least one speed parameter and at least one acceleration parameter.

18. The collision avoidance system according to claim 11, wherein the processing circuit is further used for:

estimating the first time point according to the position of the first trace point, a first motion parameter group with which the first turret runs along the first path trace, and a first kinematic function used for describing the first path trace; and estimating the second time point according to the position of the second trace point, a second motion parameter group with which the second turret runs along the second path trace, and a second kinematic function used for describing the second path trace.

19. The collision avoidance system according to claim 18, wherein the first kinematic function and the second kinematic function comprises at least one of a linear kinematic function and a curve kinematic function.

20. The collision avoidance system according to claim 11, wherein the path traces respectively denote the tip point traces of the turrets.

* * * * *